US011747894B2

(12) United States Patent
Hare et al.

(10) Patent No.: US 11,747,894 B2
(45) Date of Patent: Sep. 5, 2023

(54) SYSTEMS AND METHODS TO FACILITATE GUEST CONTROL OF A RIDE VEHICLE

(71) Applicant: Universal City Studios LLC, Universal City, CA (US)

(72) Inventors: Justin Allen Hare, Orlando, FL (US); David Smith, Orlando, FL (US); Grace Catheryn Haynes, Orlando, FL (US); Humberto Augusto Kam, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 42 days.

(21) Appl. No.: 17/470,118

(22) Filed: Sep. 9, 2021

(65) Prior Publication Data
US 2022/0083132 A1 Mar. 17, 2022

Related U.S. Application Data

(60) Provisional application No. 63/077,095, filed on Sep. 11, 2020.

(51) Int. Cl.
A63G 31/16 (2006.01)
G06F 3/01 (2006.01)
G06T 19/00 (2011.01)
A63G 31/14 (2006.01)
A63G 31/00 (2006.01)
A63G 31/04 (2006.01)

(52) U.S. Cl.
CPC ............ G06F 3/012 (2013.01); A63G 31/00 (2013.01); A63G 31/04 (2013.01); A63G 31/14 (2013.01); A63G 31/16 (2013.01); G06F 3/013 (2013.01); G06T 19/006 (2013.01)

(58) Field of Classification Search
CPC ........... A63G 7/00; A63G 31/00; A63G 31/16
USPC ................................ 472/60–61, 130; 434/55
See application file for complete search history.

(56) References Cited

U.S. PATENT DOCUMENTS

| 7,350,787 | B2 | 4/2008 | Voss |
| 7,484,460 | B2 | 2/2009 | Blum et al. |
| 8,226,484 | B2 | 7/2012 | Bryant et al. |
| 8,340,869 | B2 | 12/2012 | Wakita et al. |
| 9,120,021 | B2 | 9/2015 | Crawford et al. |

(Continued)

OTHER PUBLICATIONS

PCT/US2021/049901 International Search Report and Written Opinion dated Jan. 18, 2022.

(Continued)

Primary Examiner — Kien T Nguyen
(74) Attorney, Agent, or Firm — Fletcher Yoder, P.C.

(57) ABSTRACT

A ride vehicle control system for a ride vehicle of an attraction includes multiple sensors that are configured to monitor a guest supported by the ride vehicle. The ride vehicle control system also includes an actuator system configured to couple to the ride vehicle. The ride vehicle control system further includes one or more processors that are configured to receive signals from the multiple sensors, wherein the signals are indicative of a position of the guest, a movement of the guest, or both. The one or more processors are also configured to determine an intended movement for the ride vehicle based on the signals and to control the actuator system to adjust a resistance to movement of the ride vehicle to facilitate the intended movement.

20 Claims, 5 Drawing Sheets

(56) References Cited

U.S. PATENT DOCUMENTS

| | | |
|---|---|---|
| 9,381,940 B2 | 7/2016 | Gale |
| 10,112,118 B2 | 10/2018 | Davis |
| 10,328,897 B1 | 6/2019 | Nabbe et al. |
| 2016/0148526 A1* | 5/2016 | Morris .................. A63G 31/16 434/62 |
| 2018/0071643 A1* | 3/2018 | Cortelyou .............. A63G 21/18 |
| 2019/0022537 A1 | 1/2019 | Cummins et al. |
| 2019/0134516 A1 | 5/2019 | Bluhm |
| 2020/0171397 A1 | 6/2020 | Krauthamer et al. |
| 2021/0052989 A1* | 2/2021 | Blum ...................... A63J 25/00 |

OTHER PUBLICATIONS

Cruden, Motorcycle Simulators, https://www.cruden.com/motorcycle-simulators/, Accessed on Sep. 8, 2021, 3 pages, Amsterdam, The Netherlands.

Screen captures from YouTube video clip entitled "Cruden B306-HMD motorcycle simulator—first footage," 3 pages, uploaded May 19, 2017 by user "CrudenSimulators." Retrieved from Internet <https://www.youtube.com/watch?v=DHQYniah_GM>.

\* cited by examiner

SYSTEMS AND METHODS TO FACILITATE GUEST CONTROL OF A RIDE VEHICLE

CROSS-REFERENCE TO RELATED APPLICATIONS

This application claims priority to and the benefit of U.S. Provisional Application No. 63/077,095, entitled "SYSTEMS AND METHODS TO FACILITATE GUEST CONTROL OF A RIDE VEHICLE," filed Sep. 11, 2020, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An amusement park may include various attractions that are useful in providing guests with motion experiences and/or visual experiences. For example, an attraction may include a ride vehicle that travels along a path (e.g., a ride track) to provide motion experiences to the guests. In some cases, an attraction may include a ride vehicle that is configured to roll, pitch, and/or yaw while remaining fixed at a location (e.g., without traveling along a path) to provide motion experiences to the guests. In some cases, an attraction may include virtual reality (VR) devices that are worn by the guests to provide visual experiences to the guests. It is presently recognized that it may be desirable to enhance motion experiences and/or visual experiences for the guests of the amusement park.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a ride vehicle control system for a ride vehicle of an attraction includes multiple sensors that are configured to monitor a guest supported by the ride vehicle. The ride vehicle control system also includes an actuator system configured to couple to the ride vehicle. The ride vehicle control system further includes one or more processors that are configured to receive signals from the multiple sensors, wherein the signals are indicative of a position of the guest, a movement of the guest, or both. The one or more processors are also configured to determine an intended movement for the ride vehicle based on the signals and to control the actuator system to adjust a resistance to movement of the ride vehicle to facilitate the intended movement In an embodiment, a ride vehicle control system for a ride vehicle of an attraction includes one or more processors that are configured to receive a first signal from a head position sensor, wherein the first signal is indicative of a position of a head of a guest, a movement of the head of the guest, or both. The one or more processors are also configured to determine an intended movement for the ride vehicle based on the first signal. The one or more processors are further configured to control an actuator system to adjust a resistance to movement of the ride vehicle to facilitate the intended movement.

In an embodiment, a method of operating a ride vehicle control system includes receiving, at one or more processors, a first signal from a head position sensor, wherein the first signal is indicative of a position of a head of a guest, a movement of the head of the guest, or both. The method also includes determining, using the one or more processors, an intended movement for a ride vehicle based on the first signal. The method further includes controlling, using the one or more processors, an actuator system to adjust a resistance to movement of the ride vehicle to facilitate the intended movement by the guest shifting body weight.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
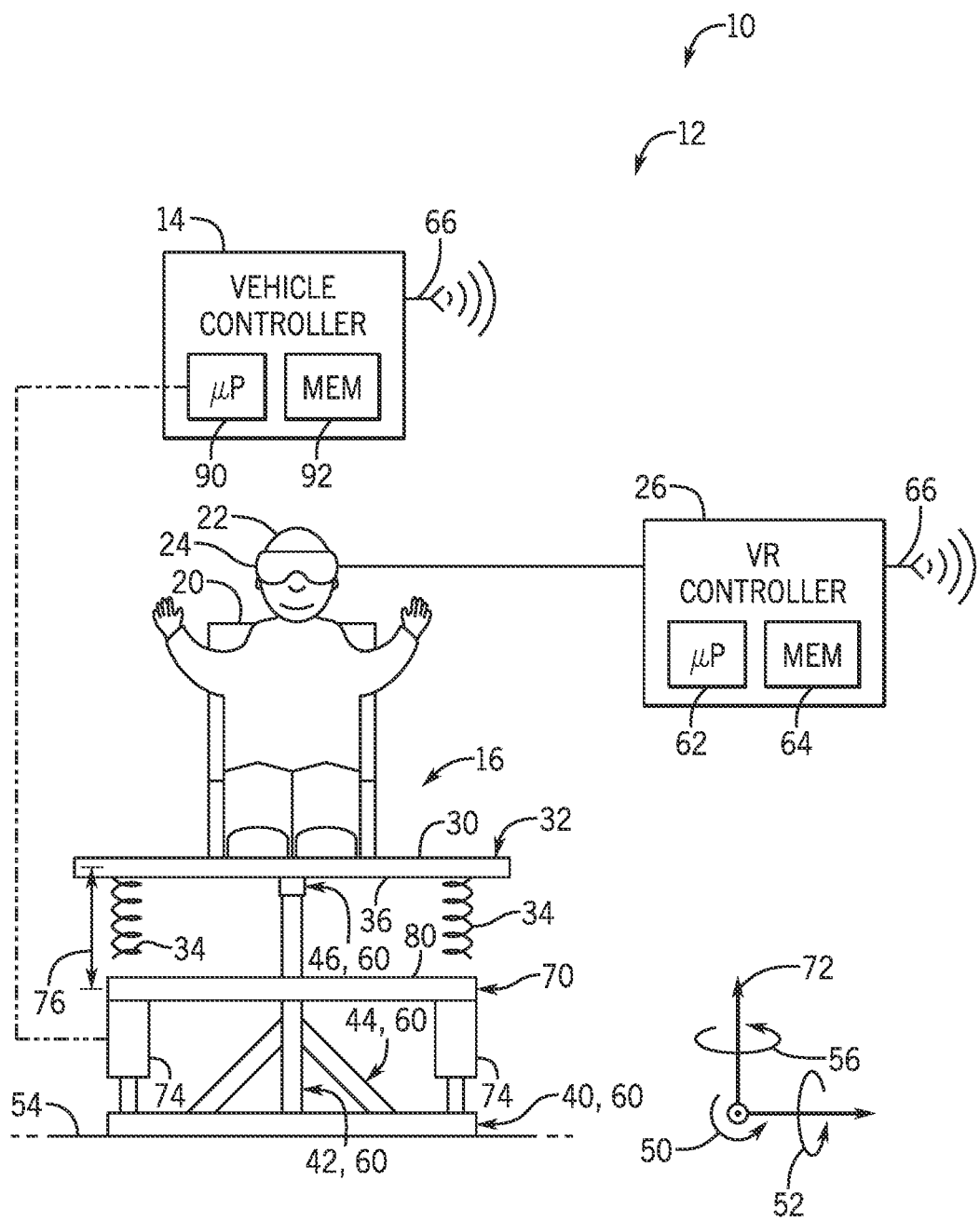
FIG. 1 is a schematic diagram illustrating an embodiment of an attraction having a ride vehicle and a ride vehicle control system, wherein the ride vehicle includes a spring-based actuation system that includes springs, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are directed to a ride vehicle control system for an attraction of an amusement park. The ride vehicle control system is configured to control an actuation system of a ride vehicle that accommodates a guest (e.g., rider) to provide a motion experience to the guest. Generally, the guest may provide inputs to the ride vehicle control system by moving relative to the ride vehicle, and the ride vehicle control system may control the actuation system of the ride vehicle based on the inputs to provide the motion experience to the guest. More particularly, the ride vehicle control system may include one or more sensors that monitor head position and/or movement, eye position and/or movement, and/or body position and/or movement (e.g., hands, limbs, and/or shifting weight) of the guest. A vehicle controller may receive, from the one or more sensors, signals that are indicative of the position(s) and/or movement(s) of the guest. Then, the vehicle controller may determine an intent of the guest based on the position(s) and/or movement(s) of the guest, and the vehicle controller may control the ride vehicle in accordance with the intent of the guest. As discussed in more detail below, the vehicle controller may receive additional inputs that relate to ride elements (e.g., physical ride elements, such as animatronic characters; virtual ride elements, such as virtual characters that are presented to the guest via a virtual reality (VR) device), and the vehicle controller may determine the intent of the guest based on the additional inputs. Advantageously, the disclosed techniques may provide the guest with a more responsive and/or immersive experience.

As illustrated in FIG. 1, an attraction 10 includes a ride vehicle control system 12 having a vehicle controller 14 and a ride vehicle 16 (e.g., a motion simulator). In an embodiment, the ride vehicle 16 may include a seat 20 that is configured to accommodate a guest 22 (e.g., rider). While the guest 22 is in the ride vehicle 16, the guest 22 may also receive a virtual experience via a VR device 24 (e.g., VR headset, wearable visualization device, head-mounted sensor device) that includes or is coupled to a VR controller 26 (e.g., additional controller).

It should be appreciated that the ride vehicle 16 may take any suitable form or appearance, such as one including a sled, a motorcycle, a car, an animal, a surfboard, a skateboard, and so forth. Additionally, while the ride vehicle control system 12 is discussed herein with reference to the ride vehicle 16 that supports one guest 22 to facilitate discussion, it should be appreciated that similar techniques may be applied to adapt the ride vehicle control system 12 for a multi-passenger ride vehicle that supports multiple guests. It should also be appreciated that the VR device 24 is optional and may not be provided as part of the attraction 10. For example, the guest 22 may not wear (e.g., on their head) any device that is integrated as part of the ride vehicle control system 12 and/or the guest 22 may not be presented with virtual features (e.g., the guest 22 may view a real-world environment). Furthermore, in an embodiment, the guest 22 may wear a non-VR device (e.g., eye-glasses, head-mounted strap) that includes head-mounted sensors that monitor the guest 22 to facilitate the disclosed techniques. In such cases, the VR controller 26 is not configured to coordinate the virtual experience, but instead may be utilized to receive signals from the head-mounted sensors that monitor the guest 22 and/or to provide the signals or other data (e.g., based on processing the signals from the head-mounted sensors) to the vehicle controller 14 (thus, the VR controller may be referred to as any type of additional controller, such as a guest-tracking controller, instead of the VR controller).

The ride vehicle 16 may have any of a variety of configurations that enable the guest 22 to provide inputs (e.g., by moving their head, eyes, and/or body) to control movement of the ride vehicle 16. For example, in an embodiment, the seat 20 may be coupled to a top surface 30 of a spring plate 32 (e.g., solid plate; open framework) of the ride vehicle 16. Springs 34 may be engaged with or coupled to a bottom surface 36 of the spring plate 32. The springs 34 may provide resistance to movement of the spring plate 32 (e.g., relative to other components of the ride vehicle 16). The ride vehicle 16 may include a base 40 that is coupled to a support beam 42 via struts 44, and the support beam 42 is also coupled to the bottom surface 36 of the spring plate 32 via a pivot joint 46. The pivot joint 46 may enable the spring plate 32 to rotate via roll 50 (e.g., roll movement) and pitch 52 (e.g., pitch movement) relative to the base 40. In an embodiment, the base 40 may be generally stationary relative to a ground surface 54. However, it should be appreciated that the base 40 may move relative to the ground surface 54, such as when the base 40 is part of a larger ride vehicle that traverses a path (e.g., a track).

In an embodiment, the pivot joint 46 may be a spherical bearing joint or universal joint that also enables the spring plate 32 to rotate via yaw 56 (e.g., yaw movement; about an axis that is parallel to a vertical axis 72) relative to the base 40. However, the pivot joint 46 may be configured to only enable movement along a single axis (e.g., corresponding to a single degree of freedom) or two axes (e.g., corresponding to two degrees of freedom), which may be suitable for simplified attractions. For example, to provide rotation around the single axis, the pivot joint 46 may be a gimbal or a hinged gimbal expansion joint. In any case, the base 40, the support beam 42, and the pivot joint 46 generally form a support assembly 60 that supports the spring plate 32, while allowing one or more degrees of freedom of pivotal movement of the spring plate 32.

The VR device 24 that may be worn by the guest 22 utilizes VR techniques, augmented reality (AR) techniques, and/or mixed reality (e.g., a combination of VR and AR) techniques to render a virtual experience for the guest 22. For example, the VR controller 26 may include a processor 62 and a memory 64, and the processor 62 may execute instructions stored in the memory 64 to instruct a display of the VR device 24 to present a set of virtual images corresponding to the virtual experience. The VR controller 26 and the vehicle controller 14 may be communicatively coupled to one another via respective communication components 66 (e.g., wireless or wired). In this way, the virtual experience provided via the VR device 24 and motion of the ride vehicle 16 may be coordinated with one another. For example, the VR controller 26 may adjust the virtual images that are presented to the guest 22 based on settings for and/or the movement of the spring plate 32. Furthermore, the virtual experience provided via the VR device 24 may be selected to correspond with a physical appearance of the ride vehicle 16 and/or a theme of the attraction 10 to thereby provide an immersive experience to the guest 22. For example, in an embodiment in which the attraction 10 is themed as a jungle, the seat 20 of the ride vehicle 16 may be designed as an animal, and the virtual experience may be displayed to the guest 22 as a race through the jungle.

In an embodiment, the ride vehicle 16 may include components that enable semi-passive control of the ride vehicle 16, which may provide advantages with respect to the experience of the guest 22 (e.g., compared to entirely passive or entirely active systems). For example, the ride vehicle 16 may include resistance-adjusting features, such as an actuator plate 70 (e.g., solid plate; open framework) positioned between the spring plate 32 and the base 40, relative to the vertical axis 72. In an embodiment, actuators 74 are coupled between the actuator plate 70 and the base 40 to adjust a position of the actuator plate 70 relative to the base 40 based on instructions from the vehicle controller 14. In particular, the vehicle controller 14 may include a processor 90 and a memory 92, and the processor 90 may execute instructions stored in the memory 92 to instruct the actuators 74 to contract or extend to any suitable actuator length, between a fully contracted length and a fully extended length, to position the actuator plate 70 at a particular separation distance 76 from the spring plate 32. The actuators 74 may be any suitable components that facilitate movement of the actuator plate 70, including electric actuators, hydraulic actuators, pneumatic actuators, magnetic actuators, mechanical actuators, and/or servo motors, and so forth. In an embodiment, the actuator plate 70 may not be directly coupled to the spring plate 32 (e.g., the actuator plate 70 and the spring plate 32 may be physically separated from one another along the vertical axis 72 at least in certain positions and/or at certain times during operation).

The springs 34 may selectively contact and compress against the actuator plate 70 in response to movements of the guest 22. For example, when the guest 22 leans to shift their weight relative to the support beam 42, the pivot joint 46 enables the spring plate 32 to rotate (e.g., tilt) accordingly, thus placing a corresponding portion of the springs 34 in contact (e.g., engaged) with a top surface 80 of the actuator plate 70. As the guest 22 continues to lean to shift their weight, the springs 34 that are in contact with the top surface 80 compress and provide resistance to slow and eventually stop the movement of the spring plate 32. By adjusting the separation distance 76 between the spring plate 32 and the actuator plate 70, the ride vehicle control system 12 may effectively adjust the effective spring constant of the springs 34 to tune the ride vehicle 16 to provide a feeling of neutral buoyancy and/or appropriate responsiveness to the guest 22 that is suited for any one of multiple VR experiences delivered by the VR device 24.

Although two springs 34 and two actuators 74 are illustrated for simplicity, it should be understood that these are representative of any number of such features. Indeed, any suitable number of springs 34 and actuators 74 may be included in the ride vehicle 16, including one spring 34 and/or one actuator 74. For example, in embodiments having a single actuator 74, the single actuator 74 may include any suitable four-bar linkage, scissor linkage, guide rails combined with wheels, or any other suitable linkage mechanism that enables the single actuator 74 to adjust the position of the actuator plate 70 in one or multiple dimensions. Additionally, in embodiments having a single spring 34, the single spring 34 may be disposed at a central position corresponding to an expected center of mass of the guest 22. It should also be understood that the springs 34, which are illustrated as mechanical, helical, or coil springs, may include or represent any suitable biasing members or resistance devices (e.g., gas springs, air springs, elastomers, leaf springs, stiff air bladders, conical spring washers, such as Belleville washers, gas struts, or magnetic repulsion assemblies, or any combination thereof). That is, any suitable device that applies a variable force as a function of a dimension of the suitable device is presently contemplated for use in the ride vehicle control system 12.

Additionally, although illustrated with the springs 34 of the spring plate 32 separated from the actuator plate 70, in other embodiments, the springs 34 may be coupled between the spring plate 32 and the base 40 to provide a normalizing bias to the spring plate 32. Moreover, it should be understood that the springs 34 may be coupled at any suitable position in the ride vehicle 16 that enables selective engagement of the springs 34, including positions in which the springs 34 engage with any suitable surface of the actuator plate 70, via cantilever action or any other suitable force-distributing components. That is, the suitable position may be any suitable position from which the springs 34 are engaged in response to rotation of the spring plate 32 beyond a threshold angle. In an embodiment, one or both ends of the springs 34 may be coupled to the spring plate 32 and selectively compressed between the spring plate 32 and the actuator plate 70. In an embodiment, the springs 34 may be coupled to the top surface 80 of the actuator plate 70. Together, the springs 34, the actuators 74, and related components may form a spring-based actuation system. Furthermore, it should be appreciated that any of a variety of spring-based actuation systems (e.g., having springs) may be implemented in the ride vehicle 16.

Figure 2:
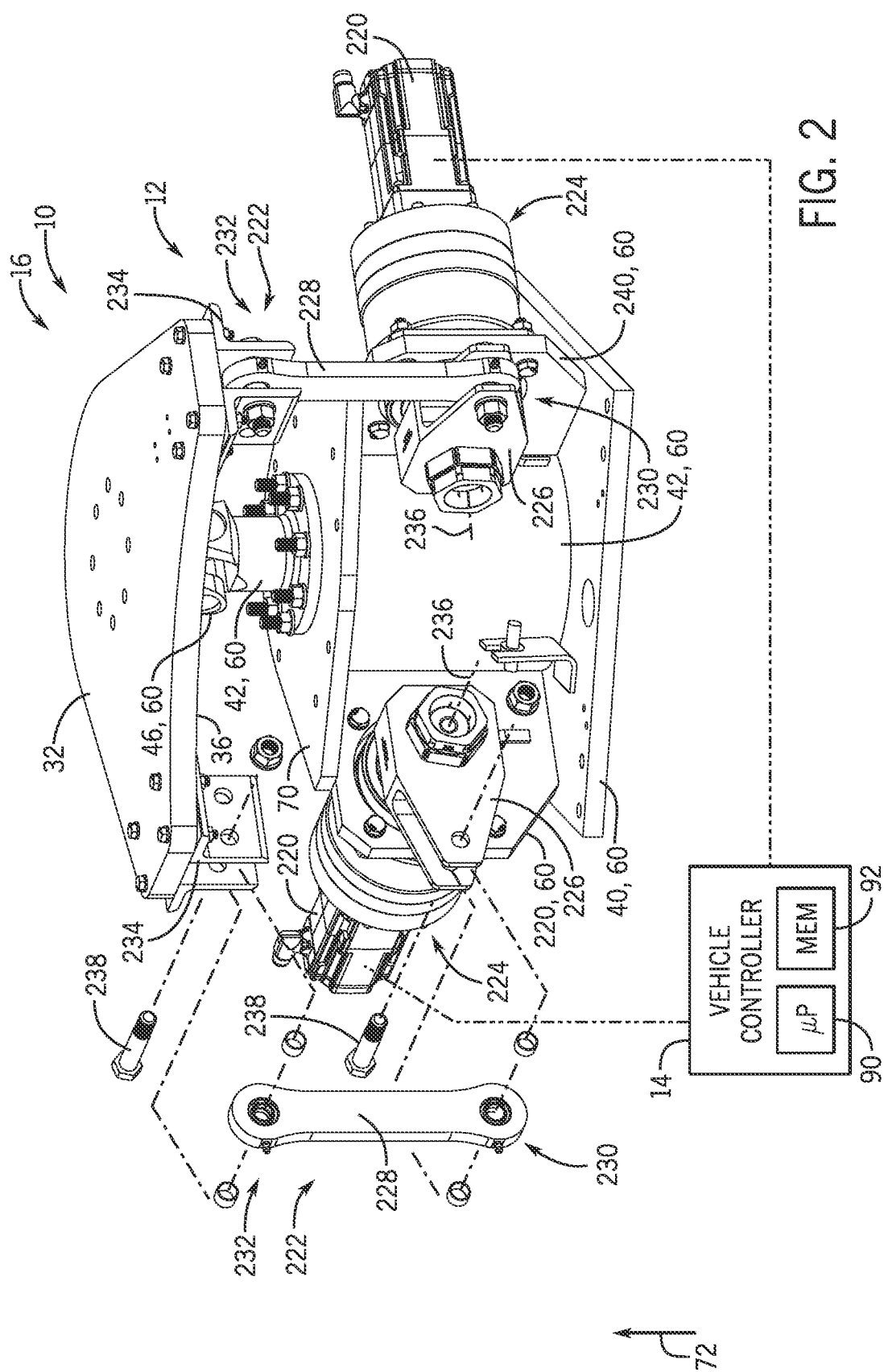
FIG. 2 is a perspective view of an embodiment of a motor-based actuation system that may be used in the ride vehicle of FIG. 1, wherein the motor-based actuation system includes two motors and two linkage systems, in accordance with embodiments of the present disclosure.

FIG. 2 illustrates an embodiment of a motor-based actuation system that may be used in the ride vehicle 16 of the attraction 10. As shown, the motor-based actuation system includes motors 220 and linkage systems 222 that operate to drive movement of the spring plate 32 about the pivot joint 46 of the support beam 42 (e.g., to drive movement of the spring plate 32 relative to the base 40). Each motor 220 (e.g., an electromechanical motor, a pneumatic motor, a hydraulic motor) may operate to adjust resistance to movement of the spring plate 32 about the pivot joint 46. In an embodiment, each motor 220 is coupled to a respective gearbox 224 and/or a respective linkage system 222. For example, the motor 220 may be coupled to the gearbox 224, and the gearbox 224 may be coupled to a first bracket 226 of the linkage system 222. Thus, a torque output by the motor 220, such as to cause rotation of a shaft of the motor 220, may drive rotation of gears of the gearbox 224 to cause rotation of the first bracket 226. As an example, the motor 220 may utilize a keyless bushing to rotate the shaft and the gearbox 224 to enable smooth movement of the spring plate 32. The first bracket 226 is coupled to a linkage 228 of the linkage system 222 at a first end 230 of the linkage 228. Further, a second end 232 of the linkage 228 may be coupled to a second bracket 234 of the linkage system 222, and the second bracket 234 may be coupled to a section (e.g., a corner, a side) of the bottom surface 36 of the spring plate 32.

The motor 220 may be configured to output a torque that may control and/or drive rotational movement of the first bracket 226 about a respective horizontal axis 236 or a respective axis parallel to the horizontal axes 236. Such rotational movement of the first bracket 226 may cause corresponding movement of the linkage 228 generally along an axis parallel to the vertical axis 72 to impart a force onto a respective section of the spring plate 32. The imparted force may move (e.g., rotate, such as pitch and/or roll) the spring plate 32 relative to the base 40. The linkage 228 may be rotatably coupled to the first bracket 226 and the second bracket 234, such as via rotatable fasteners 238 (e.g., a shoulder screw) of the linkage system 222 to enable rotational movement between the linkage 228 and the brackets 226, 234 about the respective horizontal axes 236. The rotation between the linkage 228 and the brackets 226, 234 may enable greater control of movement of the spring plate 32 relative to the base 40. Moreover, the coupling between the linkage 228 and the brackets 226, 234 may enable additional movement between the linkage 228 relative to the brackets 226, 234 to facilitate movement of the spring plate 32 relative to the base 40. As an example, the linkage 228 may linearly translate along the rotatable fasteners 238 and/or may rotate relative to the brackets 226, 234 about another axis (e.g., via additional fasteners of the linkage system 222).

In an embodiment, the linkage system 222 is supported via a plate 240 that extends between the base 40 and the actuator plate 70 (e.g., coupled to the support beam 42). For instance, the plate 240, which may be a part of the support assembly 60, may be fixedly coupled to the actuator plate 70, the base 40, and/or the support beam 42. The gearbox 224 may be fixedly coupled to the plate 240 to block movement between the gearbox 224 and the support assembly 60, thereby stabilizing the linkage system 222. In this manner, the plate 240 may facilitate provision, by the motors 220, of desirable movement of the spring plate 32 relative to the base 40.

Figure 3:
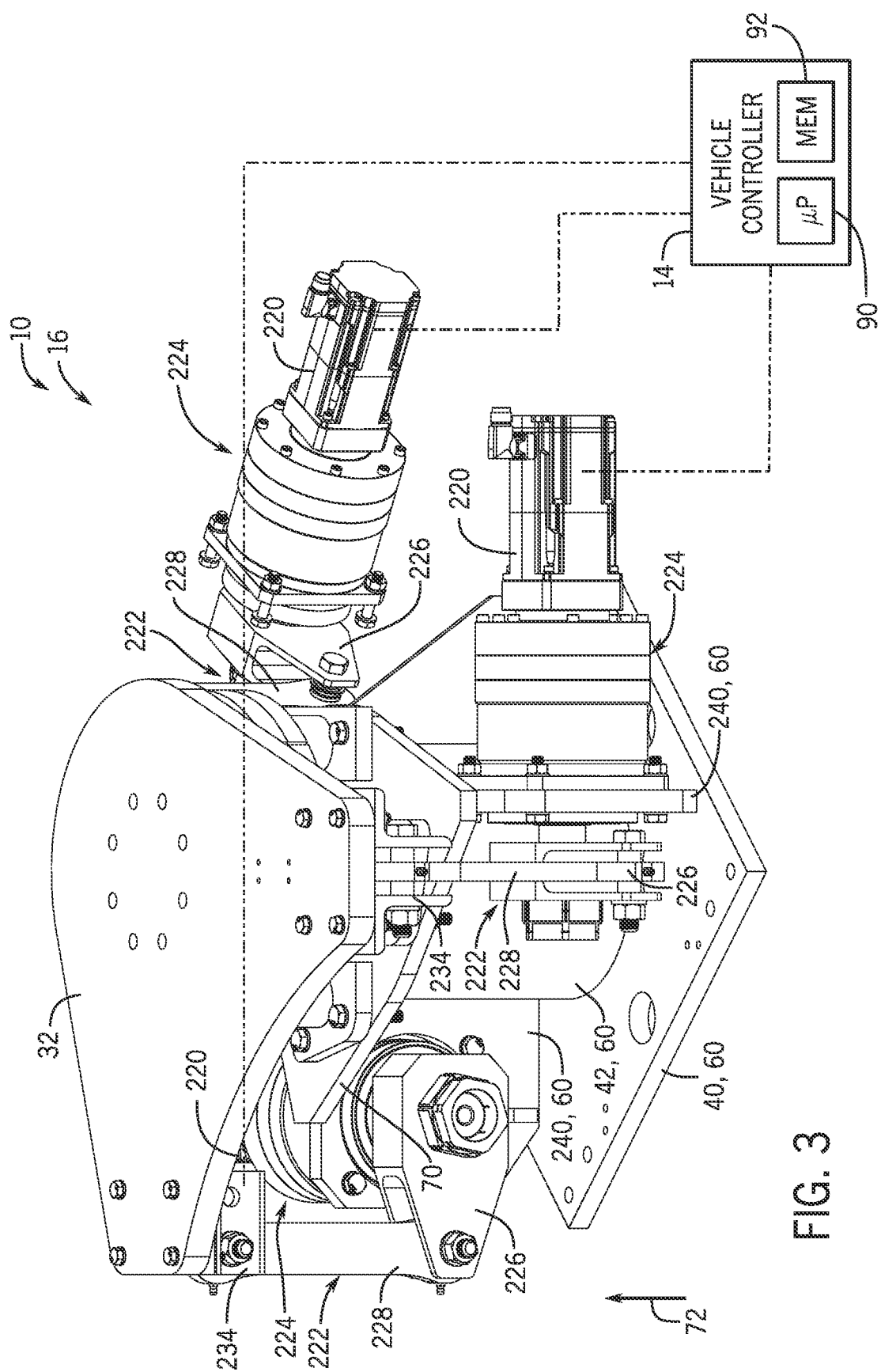
FIG. 3 is a perspective view of an embodiment of a motor-based actuation system that may be used in the ride vehicle of FIG. 1, wherein the motor-based actuation system includes three motors and three linkage systems, in accordance with embodiments of the present disclosure.

In an embodiment, each motor 220 may be back-drivable. That is, sufficient force (e.g., caused by the guest 22 shifting their weight) imparted onto the spring plate 32 may cause movement of the spring plate 32 relative to the base 40 opposite the movement of the spring plate 32 caused by the torque output by the motors 220. In other words, sufficient force may be used to cause rotation of any of the first brackets 226 in a direction opposite a direction of rotation caused by the torque output by the motors 220. In this manner, the amount of torque output by the motors 220 to impart a force onto the spring plate 32 may adjust the amount of a counter-force needed to move the spring plate 32 relative to the actuator plate 70 against the torque output by the motors 220. Thus, the torque output by the motors 220 sets a resistance to movement of the spring plate 32. In particular, increasing the torque output may increase the resistance to movement, and reducing the torque output may reduce the resistance to movement. Each motor 220 may be communicatively coupled to the vehicle controller 14, and the processor 90 may execute instructions stored in the memory 92 to control the motors 220 to output a particular torque to effectively adjust or to set the resistance to movement for the spring plate 32. While the motor-based actuation system of FIG. 2 includes two motors and two linkage systems, it should be appreciated that any suitable number of motors and linkage systems may be utilized within the ride vehicle 16. For example, FIG. 3 illustrates an embodiment of a motor-based actuation system that may be used in the ride vehicle 16, wherein the motor-based actuation system includes three motors and three linkage systems. The three motors 220 may enable greater control of the movement of the spring plate 32 as compared to controlling the spring plate 32 via two motors 220. As an example, in addition to pitching and/or rolling the spring plate 32 relative to the base 40, the vehicle controller 14 may translate the spring plate 32 along an axis parallel to the vertical axis 72, such as to heave the spring plate 32.

FIGS. 1-3 provide examples of components that may be included in the ride vehicle 16 to facilitate discussion; however, it should be appreciated that the ride vehicle 16 may have any of a variety of components and configurations. Indeed, the ride vehicle control system 12 may include or be used in conjunction with any of the features and techniques disclosed in U.S. Provisional Application No. 62/889,942, entitled "Resistance Control Systems and Methods for Amusement Attractions, and filed Aug. 21, 2019; U.S. application Ser. No. 16/687,354, entitled "Resistance Control Systems and Methods for Amusement Attractions," and filed Nov. 18, 2019; and U.S. application Ser. No. 16/929, 066, entitled "Resistance Control Systems and Methods for Amusement Attractions," and filed Jul. 14, 2020, all of which are hereby incorporated by reference in their entireties for all purposes.

Figure 4:
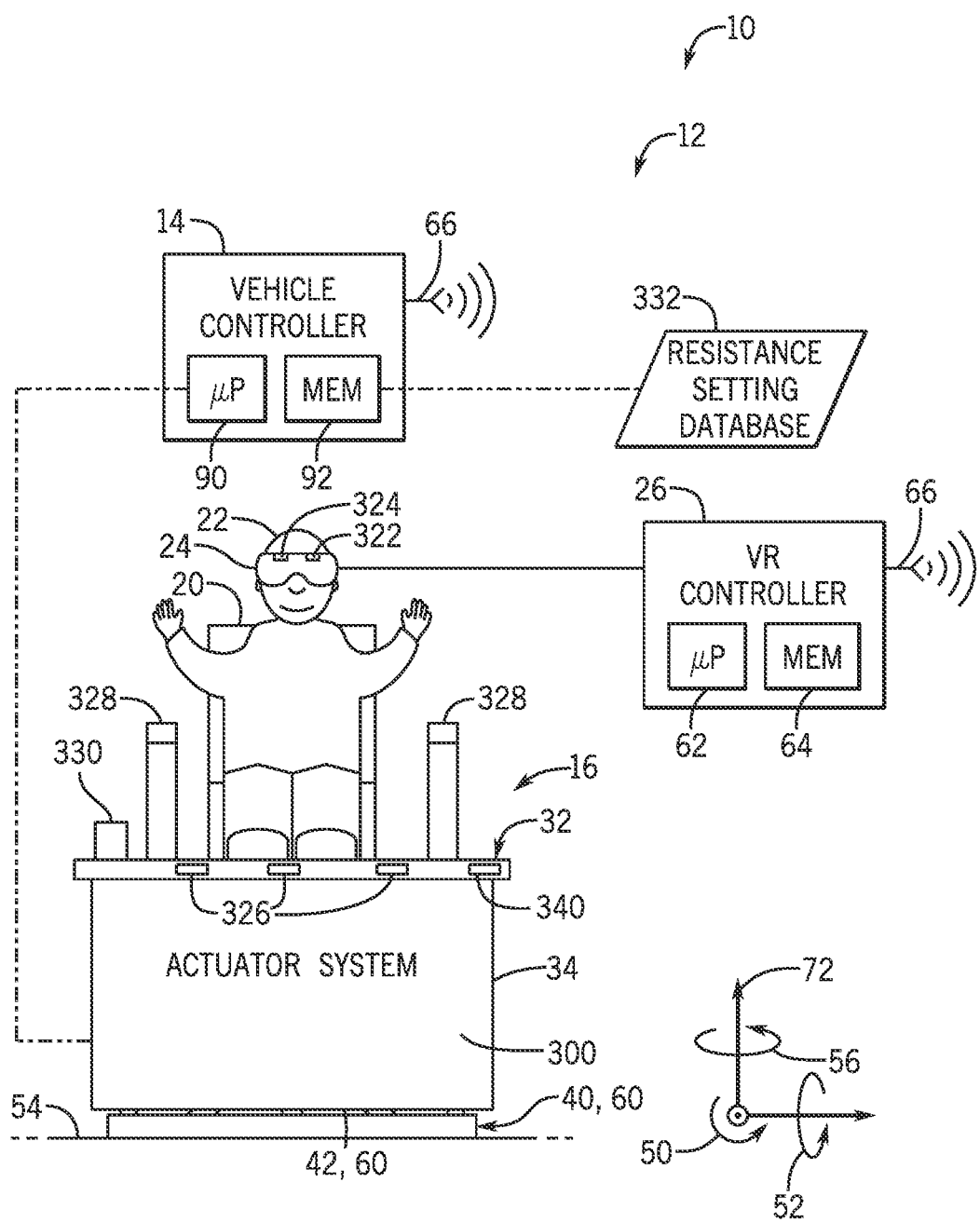
FIG. 4 is a schematic diagram illustrating an embodiment of the attraction of FIG. 1, wherein the ride vehicle includes any suitable actuation system, and multiple sensors are configured to provide signals to a vehicle controller of the ride vehicle control system, in accordance with embodiments of the present disclosure.

With the foregoing in mind, FIG. 4 illustrates an embodiment of the ride vehicle 16 having an actuator system 300 (e.g., mechanical system) that may be controlled to adjust a resistance to movement of the spring plate 32 (e.g., to make it more difficult or to make it easier for the guest 22 to move the spring plate 32 by shifting their weight) and/or to actively adjust the spring plate 32 (e.g., to drive the spring plate 32; adjust a force applied to the spring plate 32). It should be appreciated that the actuator system 300 may include a spring-based actuator system (e.g., FIG. 1), a motor-based actuator system (e.g., FIGS. 2 and 3), or any other suitable type of actuator system or mechanical system. The spring plate 32 may support the seat 20 for the guest 22. The guest 22 may wear the VR device 24, which may include or be coupled to the VR controller 26 having the processor 62 and the memory 64.

It is presently recognized that each guest 22 may have different characteristics (e.g., weight, activity level, mobility), which may affect a manner in which each guest 22 moves during the ride cycle. Thus, the vehicle controller 14 may be configured to control the actuator system 300 (e.g., the actuators 74 of FIG. 1; the motors 220 of FIG. 2) to adjust the resistance to the movement of the spring plate 32 and/or to actively adjust the spring plate 32 to account for the different characteristics of each guest 22 so that each guest 22 may enjoy the attraction 10 (e.g., be provided with a motion experience in the ride vehicle 16; feel like they are controlling the ride vehicle 16). For example, the vehicle controller 14 may be configured to control the actuator system 300 based on inputs related to head position and/or movement, eye position and/or movement, and/or body position and/or movement (e.g., hands, limbs, and/or shifting weight) of the guest 22.

In an embodiment, the vehicle controller 14 may be configured to receive signals from one or more sensors (e.g., the signals may be indicative of head position and/or movement, eye position and/or movement, and/or body position and/or movement), to process the signals to determine an intent of the guest 22, and then to control the actuator system 300 in accordance with the intent of the guest 22. For example, detection of the guest 22 leaning back and to the left may be interpreted as an intent of the guest 22 to control the ride vehicle 16 to travel up and to the left. As another example, detection of a head of the guest 22 tilting and/or turning to the left may be interpreted as an intent of the guest 22 to control the ride vehicle 16 to travel to the left.

In an embodiment, the ride vehicle control system 12 may include a head position sensor 322 (e.g., head tracking sensor) that is configured to monitor a position and/or movement of a head of the guest 22. The position may be the position (e.g., angular position) relative to the body of the guest 22 and/or the position relative to the ground surface 54 or a gravity vector, and the movement may be a velocity, an acceleration, and/or a direction of movement. As shown, the head position sensor 322 may be worn on the head of the guest 22. For example, the head position sensor 322 may be integrated into and/or coupled to the VR device 24 or other device that is worn on the head of the guest 22. In some such cases, the head position sensor 322 may be an accelerometer and/or a gyroscope. However, it should be appreciated that the head position sensor 322 may be any other suitable type of sensor, such as an image sensor (e.g., LIDAR, infrared, camera-based, blob trackers, skeletal trackers, optical trackers, RFID readers that read RFID tags worn by the guest 22) that is mounted onto the ride vehicle 16 or otherwise in proximity to the ride vehicle 16 so as to obtain images that indicate a relative position and/or movement of the head of the guest 22. Regardless of a location and/or a type of the head position sensor 322, the head position sensor 322 may provide signals indicative of the position and/or movement of the head of the guest 22 to the vehicle controller 14 (e.g., via wireless communication with the vehicle controller 14 and/or via the VR controller 26).

As discussed above, the guest 22 may generally move (e.g., rotate) the spring plate 32 by moving their body (e.g., leaning their body; shifting their weight). However, the guest 22 may begin such movements (e.g., leaning movements) with their head. For example, the guest 22 may lead with their head, such that their head moves in a direction and then their body (e.g., center of gravity) moves in the direction. The vehicle controller 14 may process the signals from the head position sensor 322 to determine an intent of the guest 22 (e.g., intended movement for the ride vehicle 16). For example, if the signals indicate that the guest 22 suddenly tilts their head to their left side, the vehicle controller 14 may determine that the guest 22 intends to tilt the spring plate 32 downward to their left side (e.g., roll). In response to determining the intent and the corresponding intended movement, the vehicle controller 14 may then reduce the resistance of the spring plate 32 to the intended movement (e.g., to enable the guest 22 to more easily tilt the spring plate 32 downward to their left side) and/or may actively adjust the spring plate 32 to achieve the intended movement (e.g., to tilt the spring plate 32 downward to their left side).

Advantageously, determining the intent of the guest 22 based on the signals from the head position sensor 322 (e.g., alone or in combination with other signals) may enable the ride vehicle 16 to move more easily for the guest 22 and/or may provide the guest 22 with a responsive ride experience even if the guest 22 has difficulty shifting their weight. Furthermore, because the guest 22 may tend to lead with their head, determining the intent of the guest 22 based on the signals from the head position sensor 322 may enable the vehicle controller 14 to anticipate (e.g., predict) how the guest 22 is likely to move their body. As a result, the resistance of the spring plate 32 and/or the adjustment to the spring plate 32 may occur prior to the movement of the body of the guest 22 and/or during an initial or beginning period of the movement of the body of the guest 22. In this way, the guest 22 may feel like the spring plate 32 is moving with their body (e.g., without delay), and the guest 22 may have a more responsive, realistic motion experience.

The ride vehicle control system 12 may include other types of sensors that monitor features of the guest 22, and the features of the guest 22 may be processed by the vehicle controller 14 to determine the intent of the guest 22. For example, the ride vehicle control system 12 may include an eye position sensor 324 (e.g., eye tracking sensor) that is configured to monitor a position and/or movement of one or both eyes of the guest 22. As shown, the eye position sensor 324 may be integrated into and/or coupled to the VR device 24 or other device that is worn on the head of the guest 22. However, in an embodiment in which the guest 22 does not wear the VR device 24 or other device that is worn on the head of the guest 22, the eye position sensor 324 may be mounted onto the ride vehicle 16 or otherwise in proximity to the ride vehicle 16 so as to monitor the position and/or movement of one or both eyes of the guest 22. As an example, the eye position sensor 324 may be an image sensor that is configured to obtain images indicative of a point of gaze (e.g., where the guest 22 is looking) and/or motion of the eye relative to the head of the guest 22. Regardless of a location and/or a type of the eye position sensor 324, the eye position sensor 324 may provide signals indicative of the position (e.g., the point of gaze) and/or movement of one or both eyes of the guest 22 to the vehicle controller 14 (e.g., via wireless communication with the vehicle controller 14 and/or via the VR controller 26).

As discussed above, the guest 22 may generally move (e.g., rotate) the spring plate 32 by moving their body (e.g., leaning their body; shifting their weight). However, the guest 22 may begin such movements (e.g., the leaning movements) with their head and/or their eyes. For example, the guest 22 may glance with their eyes in the direction that they want to move or lean, such that their eyes move in the direction and then their body (e.g., center of gravity) moves in the direction. The vehicle controller 14 may process the signals from the eye position sensor 324 to determine the intent of the guest 22. For example, if the signals indicate that the guest 22 suddenly shifts their point of gaze to their left side, the vehicle controller 14 may determine that the guest 22 intends to rotate the spring plate 32 to their left side (e.g., yaw). In response to determining the intent and the corresponding intended movement, the vehicle controller 14 may then reduce the resistance of the spring plate 32 to the intended movement (e.g., to enable the guest 22 to more easily rotate the spring plate 32) and/or may actively adjust the spring plate 32 to achieve the intended movement (e.g., to rotate the spring plate 32).

It is also presently recognized that tracking one or both eyes of the guest 22 may be particularly useful with respect to determining that the guest 22 intends to lean backward (e.g., pitch; rotate the spring plate 32 backward such that a rear portion of the spring plate 32 behind the guest 22 is lower (e.g., closer to the ground surface 54) than a front portion of the spring plate 32 in front of the guest 22), as the guest 22 may be hesitant or have difficulty leaning their head and/or their body backward while being positioned in the ride vehicle 16. Therefore, such movement of one or both eyes of the guest 22 may result in the vehicle controller 14 reducing the resistance of the spring plate 32 to make it easier for the guest 22 to rotate the spring plate 32 backward (e.g., with relatively little shift in weight) and/or actively adjusting the spring plate 32 to rotate the spring plate 32 backward.

Advantageously, determining the intent of the guest 22 based on the signals from the eye position sensor 324 (e.g., alone or in combination with other signals, such as the signals from the head position sensor 322) may enable the ride vehicle 16 to move more easily for the guest 22 and/or may provide the guest 22 with a responsive ride experience even if the guest 22 has difficulty shifting their weight. Furthermore, because the guest 22 may tend to lead with their eyes, determining the intent of the guest 22 based on the signals from the eye position sensor 324 may enable the vehicle controller 14 to anticipate (e.g., predict) how the guest 22 is likely to move their body. As a result, the resistance of the spring plate 32 and/or the adjustment to the spring plate 32 may occur prior to the movement of the body of the guest 22 and/or during the initial or beginning period of the movement of the body of the guest 22. In this way, the guest 22 may feel like the spring plate 32 is moving with their body (e.g., without delay), and the guest 22 may have a more responsive, realistic motion experience.

In an embodiment, the ride vehicle control system 12 may include an array of weight sensors 326 (e.g., in the seat 20 and/or in the spring plate 32) that is configured to monitor a position and/or movement of a body of the guest 22 (e.g., shifting weight; shifting center of gravity). The weight sensors 326 may be pressure sensors that are spaced apart from one another and/or that extend across a seating surface for the guest 22. In an embodiment, the ride vehicle control system 12 may include one or more grip sensors 328 that are configured to detect a grip strength (e.g., a force exerted by a hand of the guest 22), a grip position (e.g., hand position; a direction of the force exerted by the hand of the guest 22), and/or a grip movement (e.g., hand movement; a change in the force exerted by the hand of the guest 22) of one or both hands of the guest 22. The grip sensors 328 may be pressure sensors that are positioned on one or more handles of the ride vehicle 16 or on another portion of the ride vehicle 16 that is configured to be gripped by the guest 22 during the ride cycle. In an embodiment, the ride vehicle control system 12 may include one or more skeletal sensors 330 that are configured to monitor a position and/or movement of skeletal features (e.g., limbs) of the guest 22. The skeletal sensors 330 may include image sensors (e.g., LIDAR, infrared, camera-based, blob trackers, skeletal trackers, optical trackers, RFID readers that read RFID tags worn by the guest 22). The image sensors may be positioned on the ride vehicle 16 or in proximity to the ride vehicle 16 so as to monitor the position and/or movement of the skeletal features of the guest 22. Regardless of a location and/or a type of the weight sensors 326, the grip sensors 328, and/or the skeletal sensors 330, these sensors may provide signals indicative of the position and/or movement of the body of the guest 22 to the vehicle controller 14.

As discussed above, the guest 22 may generally move (e.g., rotate) the spring plate 32 by moving their body (e.g., leaning their body; shifting their weight) relative to the seat 20. The vehicle controller 14 may process the signals from the array of weight sensors 326 to determine the intent (e.g., intended movement) of the guest 22. For example, the guest 22 may shift their weight to a left lateral edge of the seat 20 when the guest 22 wants to rotate the spring plate 32 downward on the left lateral side of the seat 20 (e.g., roll).

During the ride, the guest 22 may also adjust their grip (e.g., hand grip) at the grip sensors 328 in a manner that indicates their intent. For example, the guest 22 may grip the handles more tightly and/or push forward against the handles while the guest 22 wants to rotate forward (e.g., pitch), and/or the guest 22 may grip the handles more loosely and/or pull backward against the handles while the guest 22 wants to rotate backward (e.g., pitch). Similarly, the guest 22 may push forward against one of the handles and pull back against one of the handles while the guest 22 wants to rotate to one side or turn (e.g., yaw). During the ride, the guest 22 may adjust their skeletal features (e.g., limbs) in a manner that indicates their intent. For example, the guest 22 may bend their arms at their elbows while the guest 22 wants to rotate forward (e.g., pitch), and/or the guest 22 may straighten their arms at their elbows while the guest 22 wants to rotate backward (e.g., pitch). Similarly, the guest 22 may bend one elbow and straighten the other elbow while the guest 22 wants to rotate to one side or turn (e.g., yaw).

The vehicle controller 14 may process the signals from the array of weight sensors 326, the grip sensors 328, and/or the skeletal sensors 330 (e.g., alone or in combination with other signals, such as the signals from the head position sensor 322 and/or the eye position sensor 324) to determine the intent of the guest 22. As noted above, in response to determining the intent and the corresponding intended movement, the vehicle controller 14 may then reduce the resistance of the spring plate 32 to the intended movement (e.g., to enable the guest 22 to more easily move the spring plate 32) and/or may actively adjust the spring plate 32 to achieve the intended movement (e.g., to move the spring plate 32).

In an embodiment, the vehicle controller 14 may receive additional inputs (e.g., signals) that relate to ride elements, such as virtual features that are being presented to the guest 22 via the VR device 24. The vehicle controller 14 may utilize the additional inputs to determine the intent of the guest 22. For example, if the additional inputs indicate that the guest 22 is being presented with a virtual road that turns to their left, then the vehicle controller 14 may determine that the intent of the guest 22 is to turn to their left (e.g., yaw). In response to determining the intent and the corresponding intended movement, the vehicle controller 14 may then reduce the resistance of the spring plate 32 to the intended movement (e.g., to enable the guest 22 to more easily turn the spring plate 32) and/or may actively adjust the spring plate 32 to achieve the intended movement (e.g., to turn the spring plate 32).

It should be appreciated that the ride elements may be utilized as one of many inputs (e.g., in addition to the signals from the one or more sensors) to determine the intent of the guest 22. In an embodiment, the ride elements may be utilized as a secondary input, such as in cases in which the signals from the one or more sensors conflict with one another (e.g., with respect to the intent of the guest 22). For example, if the signals from at least a first sensor (e.g., the head position sensor 322) indicate that the intent of the guest 22 is to turn to their left, but the signals from at least a second sensor (e.g., the grip sensors 328) indicate that the intent of the guest 22 is to turn to their right, the vehicle controller 14 may consider the ride elements to determine the intent of the guest 22 and/or an appropriate way to control the actuator system 300 to provide the guest 22 with an enjoyable ride experience (e.g., that is most consistent or coordinated with the ride elements, such as to turn to their left where the virtual road turns to their left).

It should be appreciated that the ride elements may be virtual elements that are presented via the VR device 24. In an embodiment, such as when the VR device 24 is not used during the ride cycle, the ride elements may include real, physical elements within the attraction 10. Regardless of whether the ride elements are virtual elements or real, physical elements, the ride elements may include any of a variety of objects and/or effects, such as a road, a building, a character (e.g., an animal, robot), a flash of light, a sound, or the like. For example, depending on the ride element, the vehicle controller 14 may determine or consider that the intent of the guest 22 is to lean toward the ride element (e.g., so as to follow the character due to being interested in the character) or to lean away from the ride element (e.g., so as to avoid the sound due to being frightened by the sound).

The vehicle controller 14 may also control the actuator system 300 in different ways throughout the ride cycle (e.g., while the guest 22 is in the ride vehicle 16; between boarding onto and deboarding from the ride vehicle 16). For example, the ride cycle may include a first portion in which the actuator system 300 operates in a semi-passive mode to enable the guest 22 to control the movement of the ride vehicle 16 (e.g., by shifting weight), and the ride cycle may include a second portion in which the actuator system 300 operates in an active mode to actively drive the movement of the ride vehicle 16 and/or to block the guest 22 from controlling the movement of the ride vehicle 16 (e.g., by shifting weight). As another example, the ride cycle may include a first portion in which the actuator system 300 operates in the semi-passive mode with relatively low resistance (e.g., across a relatively low resistance range) to enable the guest 22 to control the movement of the ride vehicle 16 with relatively minor movements of their body (e.g., by shifting weight), and the ride cycle may include a second portion in which the actuator system 300 operates in the semi-passive mode with relatively high resistance (e.g., across a relatively high resistance range) to enable the guest 22 to control the movement of the ride vehicle 16 with relatively major movements of their body (e.g., by shifting weight). Thus, a movement (e.g., weight shift) during the first portion of the ride cycle may result in a first movement of the spring plate 32, but the movement during the second portion of the ride cycle may result in a second movement of the spring plate 32 (or no movement of the spring plate 32). The vehicle controller 14 may also adjust the resistance over a duration of the ride cycle by increasing the resistance in response to determining that the ride cycle is nearing completion, that the guest 22 is entering a particular region of a simulated environment supported by the VR device 24, that the guest 22 has performed a certain task within the simulated environment, that the guest 22 has provided user input indicative of a requested resistance adjustment, and so forth. Varying the type of control (e.g., semi-passive, active) and/or the resistance may simulate different experiences during the ride cycle, such as driving along a road with easy control of the ride vehicle 16 during fair weather conditions and then being swept along the road with low control (or no control) of the ride vehicle 16 during poor weather conditions. In this way, the vehicle controller 14 controls the actuator system 300 in a manner that is coordinated with the ride cycle and/or the ride elements being presented to the guest 22.

In an embodiment, the vehicle controller 14 may control the actuator system 300 to encourage and/or to result in certain outcomes. Furthermore, the VR controller 26 may also present the virtual features to encourage and/or to result in certain outcomes. For example, the vehicle controller 14 may control the actuator system 300 to reduce resistance to movement in a direction (e.g., reduced relative to other directions) to encourage the guest 22 to shift their weight to direct the ride vehicle 16 in the direction (e.g., by making it easier for the guest 22). The VR controller 26 may at the same time present the virtual features, such as road blocks, that encourage the guest 22 to shift their weight to direct the ride vehicle 16 in the direction to avoid the virtual features. In this way, the vehicle controller 14 and/or the VR controller 26 may influence the movement of the ride vehicle 16, while still allowing the guest 22 to feel like they are in control of the ride vehicle 16.

As noted above, the intent of the guest 22 may be determined based on various factors (e.g., inputs; signals), such as the head position and/or movement, the eye position and/or movement, the body position and/or movement, and/or the ride elements. The vehicle controller 14 may input the various factors into algorithms, which may include lookup tables (e.g., that associate the various detected movements with corresponding changes to resistance and/or actions for the actuator system 300), to determine the intent of the guest 22. In an embodiment, the algorithms may apply different weights to the various factors. For example, the position and/or movement of the head of the guest 22 may be weighted most heavily. In an embodiment, machine learning may be utilized to associate the various factors with the intent. As used herein, machine learning may refer to mathematical models that may be used to perform a task (e.g., make predictions or decisions) without using explicit instructions, instead relying on patterns and inference. The mathematical models may be generated using training data (e.g., sample data, historical data).

In an embodiment, it may be desirable to control the actuator system 300 in a manner that is customized (e.g., personalized) for the guest 22. As noted above, each guest 22 may have certain characteristics that affect their ability to shift their weight to move the ride vehicle 16. For example, a first guest may have a low weight, a low activity level, and/or low mobility. However, a second guest may have a high weight, a high activity level, and/or high mobility. Without the disclosed embodiments (e.g., without dynamically adjusting the resistance to movement of the spring plate 32), it may be difficult to provide an enjoyable experience to both the first guest and the second guest given their different characteristics. For example, the first guest may have difficulty moving the ride vehicle 16 by shifting their weight, while the second guest may be able to easily move the ride vehicle 16 by shifting their weight. Thus, in an embodiment, the vehicle controller 14 may access and/or identify characteristics of the guest 22 and may then control the actuator system 300 in a manner that is appropriate for the characteristics of the guest 22. The vehicle controller 14 may set the resistance to be appropriate for the characteristics of the guest 22, set limit positions (e.g., maximum roll, pitch, and/or yaw) of the spring plate 32 that are appropriate for the characteristics of the guest 22, a rate of change in position of the spring plate 32 when actively driving the spring plate 32, or the like. The vehicle controller 14 may also access and/or identify a skill level of the guest 22, which may be based on a number of times that the guest 22 has previously completed the ride cycle. In this way, the vehicle controller 14 may accommodate guests with less skill or experience by adjusting for extremes of motion that suggest a different intent than for guests with more skill or experience. Generally, the algorithms (e.g., look up tables) may account for the variation in motion by different guests (e.g., by considering characteristics, including skill level), since one motion by one guest may suggest a different intent than the same motion by another guest.

In an embodiment, the vehicle controller 14 may determine characteristics of the guest 22 during an initial portion of the ride cycle (e.g., during boarding and/or during a first time period after boarding; during a calibration portion of the ride cycle). For example, during the initial portion of the ride cycle, the array of weight sensors 326 may obtain a weight of the guest 22 and the skeletal sensor 330 may determine a size (e.g., height) of the guest 22. Furthermore, during the initial portion of the ride cycle, the guest 22 may move in various ways (e.g., in response to instructions, which may be presented via the VR device 24; as encouraged by the actuator system 300 and/or the VR device 24). Then, the one or more sensors (e.g., the head position sensor 322, the eye position sensor 324, the array of weight sensors 326, the grip sensors 328, and/or the skeletal sensor 330) may monitor the position(s) and/or the movement(s) of the guest 22. This may be indicative of the activity level and/or mobility of the guest 22 (e.g., strength of inputs that the guest 22 is able to and/or is likely to provide while in the ride vehicle 16). Finally, the vehicle controller 14 may determine the activity level and/or the mobility of the guest 22 based on the signals received from the one or more sensors.

The weight, the size, the activity level, and/or mobility of the guest 22 may influence or affect how the guest 22 moves while positioned on the ride vehicle 16. In an embodiment, the vehicle controller 14 may classify the guest 22 (e.g., based on the characteristics), and/or the vehicle controller 14 may control the actuator system 300 throughout at least some or all of the remainder of the ride cycle (e.g., after the initial portion of the ride cycle) based on the characteristics of the guest 22. For example, the actuator system 300 may be controlled to provide varying resistance across a lower range of resistance values for the first guest, and the actuator system 300 may be controlled to provide varying resistance across a higher range of resistance values for the second guest.

In an embodiment, during the initial portion of the ride cycle, the vehicle controller 14 may also determine which input(s) the guest 22 utilizes or favors to attempt to control the ride vehicle 16. For example, the vehicle controller 14 may determine that the first guest primarily uses one type of input (e.g., changing their grip) and/or minimally uses or does not use another type of input (e.g., shifting weight). In such cases, the actuator system 300 may be controlled to actively drive the spring plate 32 in response to changes in the grip of the first guest, instead of relying on the first guest to shift their body weight. Or, the actuator system 300 may be controlled to reduce the resistance in response to determining the intent of the user based on changes in the grip of the first guest, to thereby make it easier for the first guest 22 to subsequently move the spring plate 32 with their body weight. Thus, each guest may be provided with a motion experience in which they feel like they are in control of the ride vehicle 16 (e.g., the ride vehicle 16 is responsive to their movements) by shifting their weight and/or by moving in other ways (e.g., changing their grip). Importantly, each guest may be provided with the motion experience even if they have certain limits to their physical abilities and/or without overexerting themselves, thereby providing for a more enjoyable experience for all guests.

Additionally, the vehicle controller 14 may operate the ride vehicle 16 in an active mode for certain guests, but not for other guests. Or the vehicle controller 14 may operate the ride vehicle 16 in the active mode more frequently for certain guests, and less frequently for other guests. For example, the active mode may be used more frequently to provide motion for the first guest, and the active mode may be used less frequently to provide motion for the second guest (since the second guest has a greater ability to shift their weight to move the ride vehicle 16). In an embodiment, the vehicle controller 14 may switch from operating the ride vehicle 16 in the semi-passive mode to operating the ride vehicle 16 in the active mode in response to failing to detect shifting weight of the guest 22 and/or in response to failing to detect movement of the ride vehicle 16 (e.g., expected movement; in a direction) after determining the intent of the guest 22 is to move the ride vehicle 16 (e.g., in the direction). For example, after determining the intent based on signals indicative of one or more of movement of the head of the guest 22, movement of the eyes of the guest 22, a change in grip of the guest 22, and/or a change in limb positioning of the guest 22, the vehicle controller 14 may reduce the resistance to movement of the ride vehicle 16. However, if the ride vehicle 16 does not move within a time period after the reduction in the resistance, the vehicle controller 14 may switch to operating in the active mode and may drive movement of the ride vehicle 16 (e.g., in the direction).

In some embodiments, the characteristics of the guest 22 may be stored in a database (e.g., as a stored profile for the guest 22). An identifier of the guest 22 may be stored with the characteristics of the guest 22. Then, during subsequent rides by the guest 22, the vehicle controller 14 may access the characteristics from the database and may control the actuator system 300 in an appropriate manner for the guest 22 (e.g., without monitoring during the initial portion of the ride cycle and/or in addition to such monitoring). For example, the guest 22 may wear an identification device (e.g., a wearable device having a radiofrequency identification (RFID) tag that is unique to the guest 22). In such cases, an RFID reader that is communicatively coupled to the vehicle controller 14 may read the identifier (e.g., code) from the RFID tag when the guest 22 is in the ride vehicle 16, and the identifier may be associated and stored with the characteristics of the guest 22. Then, during the subsequent rides by the guest 22, the RFID reader may again read the identifier from the RFID tag, provide the identifier to the vehicle controller 14 so that the vehicle controller may access the characteristics for the guest 22 from the database. It should also be appreciated that the guest 22 may input the identifier and/or the characteristics via an input device (e.g., a touch screen on the ride vehicle 16 or in a queue for the attraction 10; prior to entering the amusement park). In an embodiment, the guest 22 may input preferences related to the resistance (e.g., low or high levels of resistance) and/or movement (e.g., low or high levels of movement) that they would like to experience in the ride vehicle 16. The preferences may be stored in the database and may be associated with the identifier.

It should be appreciated that the vehicle controller 14 may also receive signals from one or more ride vehicle sensors 340, wherein the signals are indicative of a position (e.g., incline) and/or movement of the ride vehicle 16. For example, the ride vehicle sensors 340 may include an inclinometer, an accelerometer, and/or a position sensor. The vehicle controller 14 may then control the actuator system 300 based on the signals from the one or more ride vehicle sensors 340 and the intent of the guest 22. In this way, the vehicle controller 14 may account for a current position of the ride vehicle 16 when controlling the actuator system 300 to reduce the resistance to movement of the spring plate 32 and/or to actively drive the spring plate 32. For example, if the ride vehicle 16 is already at a limit position in a direction (e.g., a maximum roll, pitch, and/or yaw), the vehicle controller 14 may not further reduce the resistance in the direction and/or may not actively drive the spring plate 32 to move in the direction. Similarly, if the ride vehicle 16 is already rotated to the left and the intent of the guest 22 (e.g., as determined by the vehicle controller 14) is to move to the right, the vehicle controller 14 may adjust the resistance and/or drive the ride vehicle 16 to reach a centered or neutral position (e.g., rather than to rotate the ride vehicle 16 to the right). The signals from the one or more ride vehicle sensors 340 may also be utilized by the VR controller 26 to provide the virtual images to the guest 22 in a manner that corresponds to the movement of the ride vehicle 16.

As noted above, the actuator system 300 may operate in a semi-passive mode to impart a resistance to movement of the spring plate 32 (e.g., via movement of the actuator plate 70 in FIG. 1; via torque output of the motors 220 in FIGS. 2 and 3). In some such cases, the vehicle controller 14 may refer to a resistance setting database 332 to determine a particular target resistance (e.g., that is appropriate for the characteristics of the guest 22 and/or the ride cycle) and settings for the actuator system 300 (e.g., the position of the actuator plate 70 in FIG. 1; the torque output of the motors 220 in FIGS. 2 and 3) to achieve the particular target resistance. Additionally or alternatively, the actuator system 300 may operate in an active mode in which the spring plate 32 is driven to move (e.g., in FIGS. 2 and 3, one or more motors 220 are instructed to output a torque that overcomes the force imparted by the guest 22 onto the spring plate 32) to thereby position the spring plate 32. Indeed, in the active mode, the vehicle controller 14 may operate the actuator system 300 to drive the spring plate 32 to move in a desirable manner (e.g., to a target position or orientation), instead of enabling the guest 22 to drive movement of the spring plate 32 (e.g., as in the semi-passive mode). For instance, the vehicle controller 14 may operate in the active mode to move the spring plate 32 and impart a certain sensation and ride experience to the guest 22. The vehicle controller 14 may utilize the intent of the guest 22 and a current position of the spring plate 32 to determine the appropriate way to control the actuator system 300 to move the spring plate 32 (e.g., the appropriate torque to be output by the one or more motors 220 to cause the desirable movement of the spring plate 32). It should be appreciated that the vehicle controller 14 may receive feedback or inputs that indicate a current resistance as well (e.g., the length of the actuators 74 in FIG. 1; the torque output by the motors 220 in FIGS. 2 and 3) to enable the vehicle controller 14 to appropriately adjust the resistance for the guest 22.

The vehicle controller 14 may be included in a housing or chassis of the ride vehicle 16, or the vehicle controller 14 may be remote to the ride vehicle 16 and coordinate operation of multiple ride vehicles 16. The vehicle controller 14 includes the processor 90 that provides instructions to the actuator system 300 and the memory 92 that stores the instructions for the processor 100. The memory 92 may also store the resistance setting database 332. However, it is to be understood that any components can be suitably stored in and updated from any suitable location, such as within a cloud database. The processor 90 may include one or more processors that can execute instructions for carrying out the presently disclosed techniques, such as a general-purpose processor, system-on-chip (SoC) device, an application-specific integrated circuit (ASIC), or some other similar processor configuration. In some embodiments, these instructions are encoded in programs or code stored in a tangible, non-transitory, computer-readable medium, such as the memory 92 and/or other storage circuitry or device. It should be appreciated that processing steps and techniques disclosed herein may be carried out by the vehicle controller 14 alone or in conjunction within another controller that is communicatively coupled to the vehicle controller 14 (e.g., in conjunction with the VR controller 26 and/or any other type of additional controller, such as a guest tracking controller that receives, transmits, and/or processes signals indicative of the position and/or movement of the guest 22).

Figure 5:
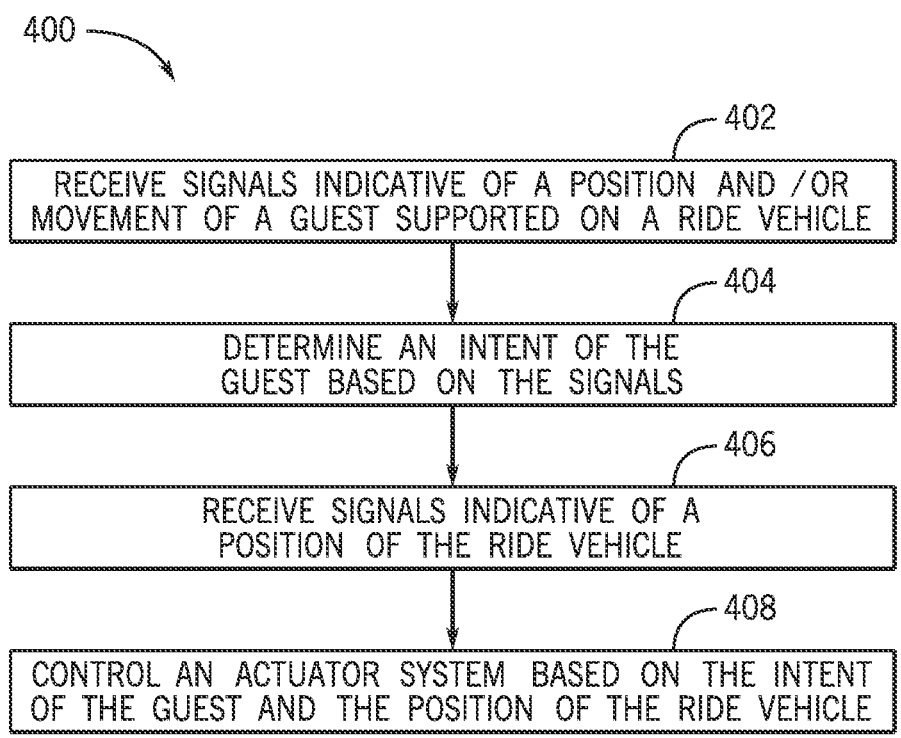
FIG. 5 is a flow diagram of an embodiment of a method of operating a ride vehicle of an attraction, in accordance with embodiments of the present disclosure.

FIG. 5 is a flow diagram illustrating an embodiment of a method 400 for controlling the actuator system of the ride vehicle. The method 400 disclosed herein includes various steps represented by blocks. It should be noted that at least some steps of the method 400 may be performed as an automated procedure by a computing system, such as by the vehicle controller. Although the flow chart illustrates the steps in a certain sequence, it should be understood that the steps may be performed in any suitable order and certain steps may be carried out simultaneously, where appropriate. Additionally, steps may be added to or omitted from the method 400.

As shown, in step 402, the method 400 may begin by receiving signals indicative of a position and/or movement of a guest that is supported in the ride vehicle. The signals may include signals from a head position sensor, wherein the signals are indicative of a position and/or movement of a head of the guest. Additionally or alternatively, the signals may include signals from an eye position sensor, wherein the signals are indicative of a position and/or movement of one or both eyes of the guest. Additionally or alternatively, the signals may include signals from an array of weight sensors, wherein the signals are indicative of weight shifting of the guest. Additionally or alternatively, the signals may include signals from a grip sensor, wherein the signals are indicative of a grip strength, hand position, and/or hand movement of the guest. Additionally or alternatively, the signals may include signals from a skeletal sensor, wherein the signals are indicative of a skeletal position and/or movement (e.g. limb position and/or movement) of the guest. For example, one or more signals indicative of one or more positions and/or movements of the guest may be received at the vehicle controller.

As shown in step 404, the method 400 may then proceed to determine an intent of the guest (e.g., how the guest wants or intends to move the ride vehicle; the intended movement for the ride vehicle) based on the signals. It is presently recognized that the position(s) and/or movement(s) may be indicative of the intent of the guest. For example, the guest may move their head to their left when the guest wants to rotate or move the ride vehicle to their left. The vehicle controller may use one or more algorithms to determine the intent of the guest based on the signals. As noted herein, the vehicle controller may also consider ride elements to determine the intent of the guest.

As shown in step 406, the method 400 may also include receiving signals indicative of a position (e.g., incline) of the ride vehicle. The signals may include signals from a ride vehicle sensor that is coupled to the ride vehicle, and the signals may be received at the vehicle controller. In step 408, the method 400 may include controlling an actuator system based on the intent of the guest and the position of the ride vehicle. For example, the vehicle controller may instruct the actuator system to adjust a resistance to movement of a spring plate of the ride vehicle to adjust the ride vehicle's response to weight shifting by the guest (e.g., to make it easier or to make it more difficult for the guest to rotate the spring plate). In an embodiment, the vehicle controller may instruct the actuator system to actively drive the spring plate of the ride vehicle. As noted herein, the vehicle controller may carry out other steps, such as determining characteristics of the guest, accessing a resistance setting database, determining appropriate resistance settings based on the characteristics of the guest and/or ride cycle, and the like to provide a motion experience to the guest. Furthermore, the vehicle controller may control the actuator system so that the motion experience is coordinated with a visual experience, which may be presented to the guest via a VR device. For example, the vehicle controller may adjust the resistance to movement of the spring plate based on the visual experience (e.g., to provide less control to the guest during some portions of the ride cycle and to provide more control to the guest during other portions of the ride cycle).

Technical effects of the disclosed ride vehicle control system include enabling dynamic adjustment of a resistance of a ride vehicle and/or actively controlling movement of the ride vehicle based on various inputs from a guest in the ride vehicle. The disclosed ride vehicle control system provides an improved experience for guests having a wide range of characteristics.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ride vehicle control system for a ride vehicle of an attraction, the ride vehicle control system comprising:
   a plurality of sensors configured to monitor a guest supported by the ride vehicle;
   an actuator system configured to couple to the ride vehicle; and
   one or more processors configured to:
      receive signals from the plurality of sensors, wherein the signals are indicative of a position of the guest, a movement of the guest, or both;
      determine an intended movement for the ride vehicle based on the signals; and
      control the actuator system to adjust a resistance to movement of the ride vehicle, to adjust a force applied to the ride vehicle, or both to facilitate the intended movement.

2. The ride vehicle control system of claim 1, wherein the plurality of sensors comprises a head position sensor, and the signals comprise one or more signals indicative of a head position of the guest, a head movement of the guest, or both.

3. The ride vehicle control system of claim 1, wherein the plurality of sensors comprises an eye position sensor, and the signals comprise one or more signals indicative of an eye position of one or both eyes of the guest, an eye movement of the one or both eyes of the guest, or both.

4. The ride vehicle control system of claim 1, wherein the plurality of sensors comprises a grip sensor, and the signals comprise one or more signals indicative of a grip strength, a grip position of the guest, a grip movement of the guest, or any combination thereof.

5. The ride vehicle control system of claim 1, wherein the plurality of sensors comprises a skeletal sensor, and the signals comprise one or more signals indicative of a limb position of the guest, a limb movement of the guest, or both.

6. The ride vehicle control system of claim 1, wherein the actuator system comprises:
   one or more motors; and
   one or more linkage systems that are configured to couple the one or more motors to the ride vehicle, wherein the one or more processors are configured to adjust the resistance to the movement of the ride vehicle by controlling an output torque of the one or more motors.

7. The ride vehicle control system of claim 1, wherein the one or more processors are configured to control presentation of virtual images to the guest via a VR device worn by the guest.

8. The ride vehicle control system of claim 7, wherein the one or more processors are configured to determine the intended movement for the ride vehicle based on the signals and the virtual images that are being presented to the guest via the VR device worn by the guest.

9. The ride vehicle control system of claim 1, wherein the actuator system is configured to operate in a semi-passive mode that enables the guest to move the ride vehicle by shifting their body weight.

10. A ride vehicle control system for a ride vehicle of an attraction, the ride vehicle control system comprising:
   one or more processors configured to:
      receive a first signal from a head position sensor, wherein the first signal is indicative of a position of a head of a guest supported by the ride vehicle, a movement of the head of the guest, or both;
      determine an intended movement for the ride vehicle based on the first signal; and
      control an actuator system to adjust a resistance to movement of the ride vehicle to facilitate the intended movement.

11. The ride vehicle control system of claim 10, wherein the one or more processors are configured to:
   receive a second signal from an eye position sensor, wherein the second signal is indicative of an eye position of one or both eyes of the guest, an eye movement of the one or both eyes of the guest, or both; and
   determine the intended movement for the ride vehicle based on the first signal and the second signal.

12. The ride vehicle control system of claim 11, wherein the one or more processors are configured to:
   receive a third signal from a grip sensor, wherein the third signal is indicative of a grip strength, a grip position of the guest, a grip movement of the guest, or any combination thereof; and
   determine the intended movement for the ride vehicle based on the first signal, the second signal, and the third signal.

13. The ride vehicle control system of claim 11, wherein the one or more processors are configured to:
   receive a fourth signal from a skeletal sensor, wherein the fourth signal is indicative of a limb position of the guest, a limb movement of the guest, or both; and
   determine the intended movement for the ride vehicle based on the first signal, the second signal, and the fourth signal.

14. The ride vehicle control system of claim 10, wherein the one or more processors are configured to:
   control presentation of virtual images to the guest via a VR device worn by the guest; and
   determine the intended movement for the ride vehicle based on the first signal and the virtual images that are being presented to the guest via the VR device worn by the guest.

15. The ride vehicle control system of claim 10, comprising the actuator system, wherein the actuator system comprises:

one or more motors; and one or more linkage systems that are configured to couple the one or more motors to the ride vehicle, wherein the one or more processors are configured to control an output torque of the one or more motors to adjust the resistance to the movement of the ride vehicle to facilitate the intended movement.

16. The ride vehicle control system of claim 10, wherein the one or more processors are configured to:

determine one or more characteristics of the guest, including a characteristic corresponding to a body weight of the guest; and control the actuator system to adjust the resistance based on the one or more characteristics of the guest to facilitate the intended movement.

17. The ride vehicle control system of claim 16, wherein the one or more processors are configured to determine the one or more characteristics of the guest during a calibration portion of a ride cycle.

18. The ride vehicle control system of claim 10, wherein the one or more processors are configured to operate the actuator system in a semi-passive mode to enable the guest to move the ride vehicle by shifting body weight.

19. The ride vehicle control system of claim 10, wherein the one or more processors are configured to operate the actuator system in an active mode to drive the ride vehicle in accordance with the intended movement.

20. A method of operating a ride vehicle control system, the method comprising:

receiving, at one or more processors, a first signal from a head position sensor, wherein the first signal is indicative of a position of a head of a guest supported by a ride vehicle, a movement of the head of the guest, or both;

determining, using the one or more processors, an intended movement for the ride vehicle based on the first signal; and controlling, using the one or more processors, an actuator system to adjust a resistance to movement of the ride vehicle to facilitate the intended movement by the guest shifting body weight.

* * * * *